(12) United States Patent
Sterns et al.

(10) Patent No.: US 6,889,998 B2
(45) Date of Patent: May 10, 2005

(54) FOLDABLE UTILITY CART WITH LIFT MECHANISM

(75) Inventors: Ronni S. Sterns, Akron, OH (US);
Harvey L. Sterns, Akron, OH (US);
Anthony A. Sterns, Akron, OH (US);
Charles A. Nelson, Akron, OH (US);
James J. Kilcoyne, Akron, OH (US);
Wayne D. Porter, Jr., Brecksville, OH (US)

(73) Assignee: Creative Action LLC, Akron, OH (US)

( * ) Notice: Subject to any disclaimer, the term of this patent is extended or adjusted under 35 U.S.C. 154(b) by 125 days.

(21) Appl. No.: 10/296,663

(22) PCT Filed: Jun. 5, 2001

(86) PCT No.: PCT/US01/18155

§ 371 (c)(1),
(2), (4) Date: Nov. 25, 2002

(87) PCT Pub. No.: WO01/94179

PCT Pub. Date: Dec. 13, 2001

(65) Prior Publication Data

US 2004/0222605 A1 Nov. 11, 2004

Related U.S. Application Data

(60) Provisional application No. 60/209,342, filed on Jun. 5, 2000.

(51) Int. Cl.[7] .................................................. B62B 1/00

(52) U.S. Cl. ............ 280/651; 280/33.991; 280/DIG. 3; 280/DIG. 4

(58) Field of Search ...................... 280/33.991–31.997, 280/47.34, 37.35, 651, 38, 641, DIG. 3, DIG. 4

(56) References Cited

U.S. PATENT DOCUMENTS

| 1,795,942 A | 3/1931 | Flagstad |
| 2,697,450 A | 12/1954 | Knauth |

(Continued)

Primary Examiner—Bryan Fischmann
(74) Attorney, Agent, or Firm—Rankin, Hill, Porter & Clark, LLP

(57) ABSTRACT

A foldable utility cart (10) includes a pair of spaced, parallel frame members (22). A collar (50) is disposed about each of the frame members (22) and is slidable therealong. A pair of front legs (40) and a pair of rear legs (46) are pivotally connected to the collars (50). The front and rear legs (40, 46) each support a wheel (44, 48). The collars (50) can be moved from a raised position where the legs (40, 46) and wheels (44, 48) are folded adjacent each other, to a lowered position where the legs (40, 46) and wheels (44, 48) are extended to support the cart (10) for movement on the ground. The cart (10) includes a moveable basket carrier assembly (18). The basket carrier assembly (18) includes toothed racks (110) that are connected to channel members (24) for movement therealong. A ratchet clutch (136) is used to permit up or down movement of the racks (110) and to maintain the racks (110) at any desired vertical position.

15 Claims, 8 Drawing Sheets

U.S. PATENT DOCUMENTS

| | | |
|---|---|---|
| 3,378,161 A | 4/1968 | Lookabaugh |
| 3,655,212 A | 4/1972 | Krass |
| 3,774,929 A | 11/1973 | Stanley |
| 4,175,761 A | 11/1979 | Marshall |
| 4,630,837 A | 12/1986 | Kazmark |
| 5,575,605 A | 11/1996 | Fisher |
| 5,577,745 A | 11/1996 | Birk |
| 5,887,887 A | 3/1999 | Keuning |
| 5,938,396 A | 8/1999 | Audet |
| 6,176,498 B1 | 1/2001 | Murphy |
| 6,203,054 B1 | 3/2001 | Matsumoto |

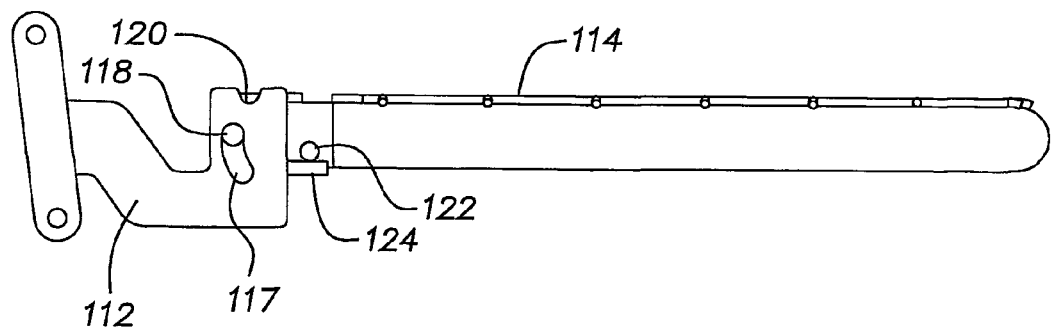
FIG. 10
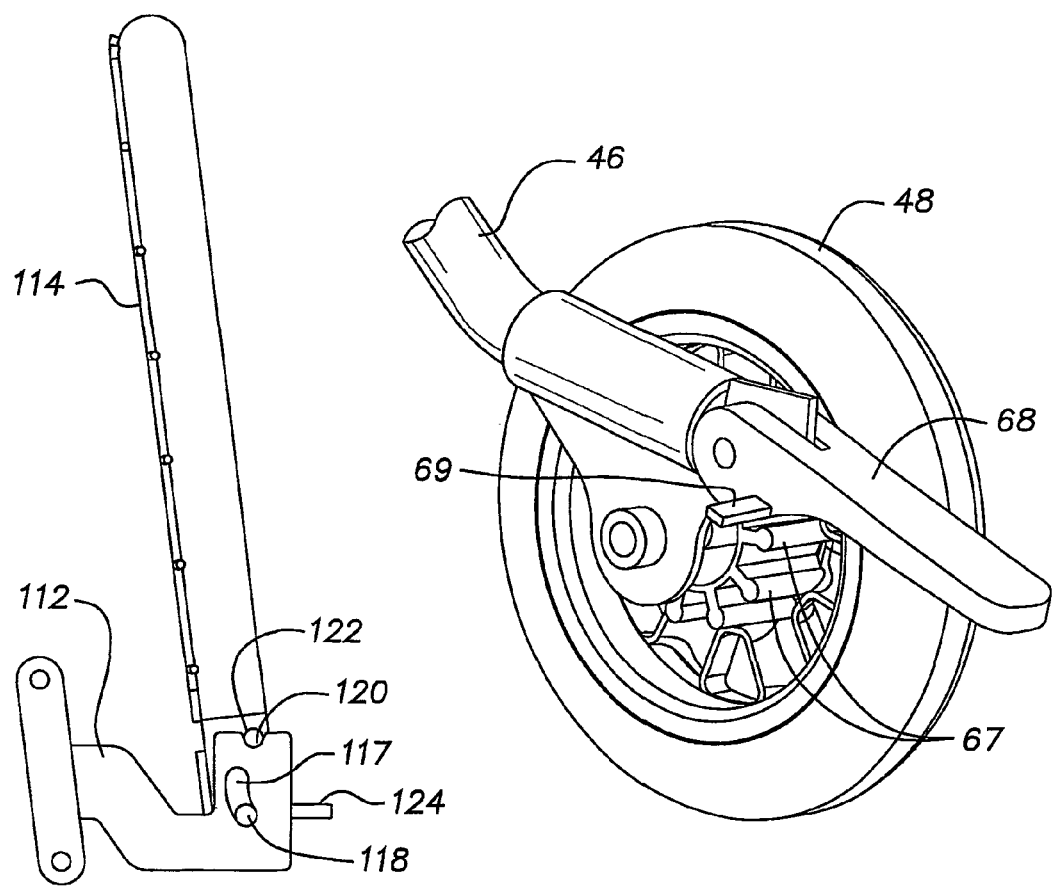
FIG. 11
FIG. 12

FOLDABLE UTILITY CART WITH LIFT MECHANISM

REFERENCE TO PROVISIONAL APPLICATION

The present application claims priority from, and incorporates by reference, U.S. provisional application Ser. No. 60/209,342, filed Jun. 5, 2000.

This invention was made with government support under Small Business Innovation Research Program Grant Number 2 R44 AG11500-02, awarded by the National Institute of Health's National Institute on Aging. The government has certain rights in this invention.

BACKGROUND OF THE INVENTION

1. Field of the Invention

The invention relates to manually operated utility carts of the type adapted to carry a portable receptacle such as a basket. More particularly, the invention relates to a foldable utility cart that includes a lift mechanism to enable the basket to be raised and lowered.

2. Description of the Prior Art

Various types of utility carts are known. For example, the patent to Stottrup, U.S. Pat. No. 2,422,862, discloses a folding utility cart suitable for carrying laundry baskets, shopping bags, and so forth. Similarly, the patent to Carlile, U.S. Pat. No. 4,865,346, discloses a collapsible cart assembly useful for carrying light loads such as picnic baskets. A particularly effective utility cart is disclosed in U.S. Pat. No. 6,176,498, issued Jan. 23, 2001 to Kent W. Murphy, et al. ("the Lift Mechanism Invention"), the disclosure of which is incorporated herein by reference.

The Lift Mechanism Invention represented an improvement over prior utility carts because it included a lift mechanism that enabled a load-carrying basket to be raised and lowered conveniently. The Lift Mechanism Invention was very stable because it had a sturdy, H-shaped base frame from which rollers depended. The basket was raised and lowered by a hand-actuated rack and pinion assembly included as part of vertically oriented upright supports.

Despite the advances of the Lift Mechanism Invention, there remains a need for a compact, lightweight utility cart having a vertically movable basket. Desirably, any such cart would be collapsible for purposes of transport and storage. Any such cart preferably should be (1) capable of being folded and unfolded easily, (2) capable of standing upright without external support when folded, (3) provided with brakes that are easy to operate, and (3) capable of locking the basket at any desired vertical location.

SUMMARY OF THE INVENTION

In response to the foregoing concerns, the present invention provides a new and improved utility cart that incorporates the essential teachings of the Lift Mechanism Invention, but which has additional features not disclosed in the Lift Mechanism Invention. The present invention employs a frame that includes pair of spaced, parallel tubes. A collar is disposed about each of the tubes and is slidable therealong. A pair of front legs and a pair of rear legs are pivotally connected to the collars. The front and rear legs each support a wheel. A lift bar is connected to each of the collars. The lift bar can be moved from a raised position where the collars are raised along the frame members and the legs and wheels are folded adjacent each other, to a lowered position where the collars are lowered along the frame members and the legs and wheels are extended to support the cart for movement on the ground. When the cart is folded, it can be conveniently transported in the trunk of an automobile or stored in a closet.

The front legs are connected by a bight portion. A shelf is connected to the bight portion and extends rearwardly toward the frame. A bumper extends forwardly and downwardly from the bight portion. The bumper preferably is covered with a resilient material such as rubber. When the cart is folded, the bumper frictionally engages the ground and serves as a stand to keep the cart in a vertical position.

The cart further includes a simple, reliable means for moving the basket up and down and for maintaining the basket in any desired vertical position. The basket is supported by a folding platform that is attached to a pair of spaced, parallel toothed racks. The racks are connected to the main frame for vertical movement. A pair of pinions and a driven pulley are supported for rotation by a shaft that is connected to the frame. The pinions are in contact with the racks. A ratchet clutch having a drive pulley and a crank handle is connected to the main frame. A toothed drive belt is reeved about the drive pulley and the driven pulley. In order to raise or lower the basket, the user grasps the crank handle and turns it to raise or lower the basket to the desired position. The ratchet clutch can be adjusted to permit the basket to be moved up or down and for the position of the basket to be maintained at any desired vertical location.

The invention includes a brake for one of the rear wheels. Preferably, one of the rear wheels includes a toothed gear. A lever is pivotally connected to the rear leg. The lever can be pivoted to engage the teeth of the gear in order to prevent the gear and, hence, the wheel, from rotating. If desired, a brake can be provided for each of the rear wheels.

The basket preferably is formed from segments of welded wire that are joined to each other by hinged connections. The basket can be collapsed when the wheels are folded and extended when the wheels are extended. This feature enables the cart to be folded to a small size for convenient storage. It is expected that a flexible, foldable liner made of canvas or other suitable material will be provided for the interior of the basket. The basket is connected to the racks so that it cannot be dislodged inadvertently from the platform, but the connection between the basket and the racks is such that the basket can be removed from the platform easily merely by lifting the basket vertically relative to the platform.

The foregoing and other features and advantages of the invention will be apparent to those skilled in the art from an examination of the specification and claims that follow, including the accompanying drawings.

BRIEF DESCRIPTION OF THE DRAWINGS

FIGS. 10 and 11 are portions of a basket-supporting platform and hinge showing the platform in extended and folded positions, respectively; and FIG. 12 is an enlarged perspective view of a wheel and brake.

DESCRIPTION OF THE PREFERRED EMBODIMENT

Figure 1:
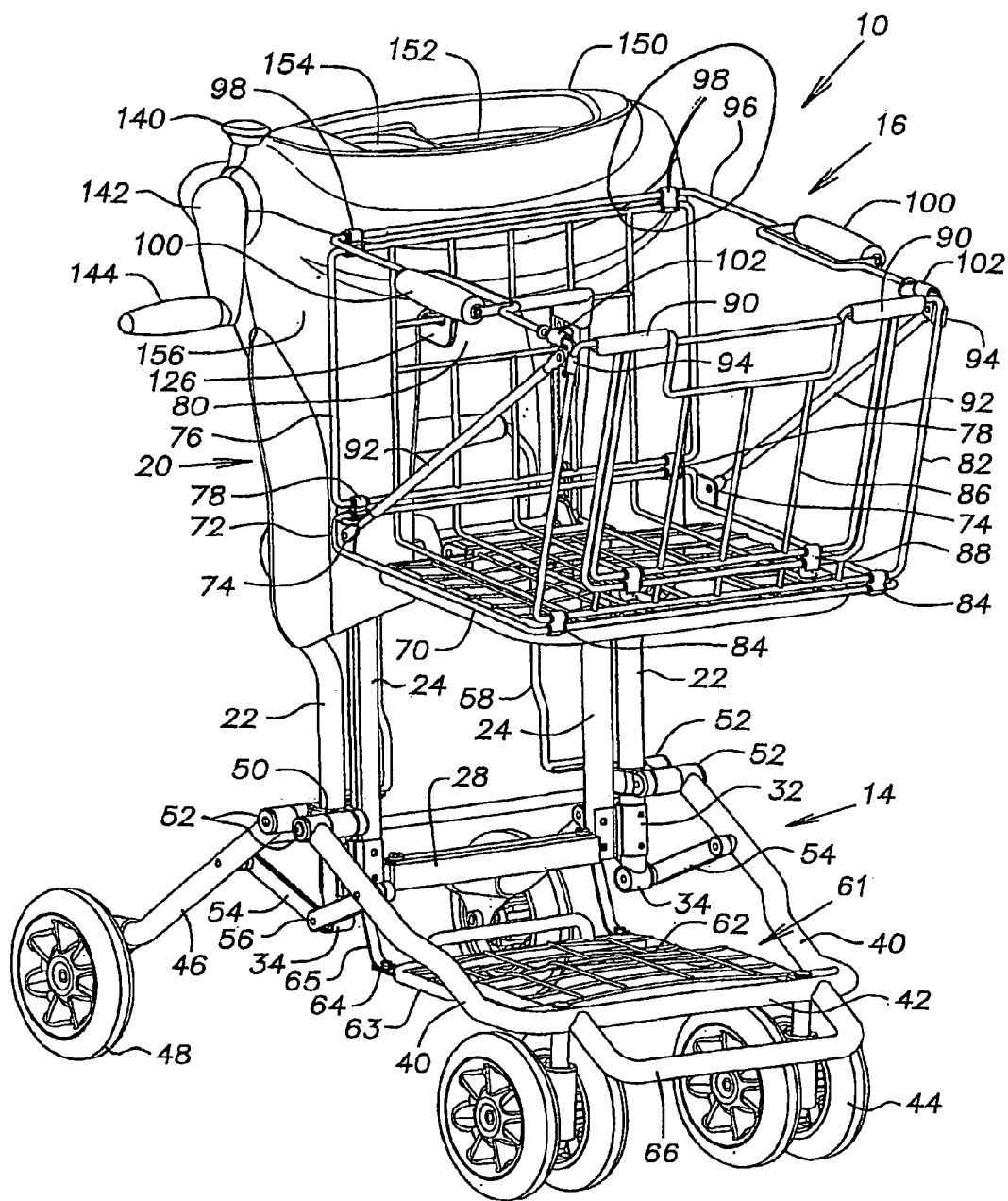
FIG. 1 is a front perspective view of a foldable utility cart according to the invention showing a basket in a raised position.

With reference to the various Figures, a utility cart 10 according to the present invention comprises several major components, specifically, a frame 12, a wheeled support assembly 14, a basket 16, a basket carrier assembly 18, and a housing 20. Many of the components of the cart 10 are made of inexpensive, lightweight aluminum tubing that can be joined easily by bolts, screws or rivets, and which can be bent readily to any desired shape. In the description that follows, various terms of reference or orientation will be used, such as "upper," front," "vertical," "horizontal," and so forth. The use of such terms is for convenience of description only, it being understood that the cart 10 can be operated in various orientations and that other terms of description could be used, if desired. Also, it will be understood that the components of the invention that are connected to each other can be joined by conventional techniques such as mechanical fasteners, adhesives, and welds. The cart 10 now will be described with reference to its various major components.

The Frame 12

Figure 2:
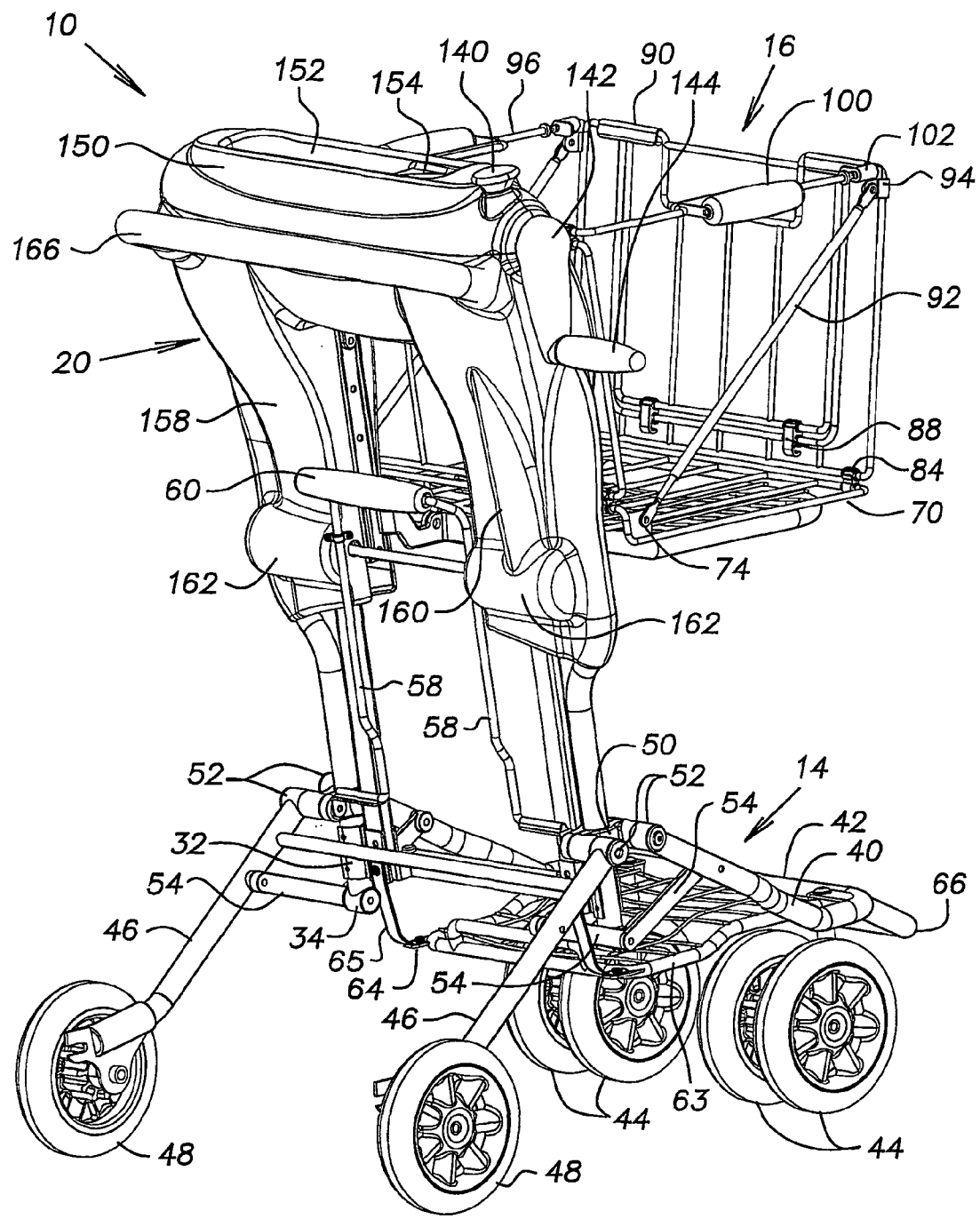
FIG. 2 is a perspective view from the rear of the cart of FIG. 1.
Figure 4:
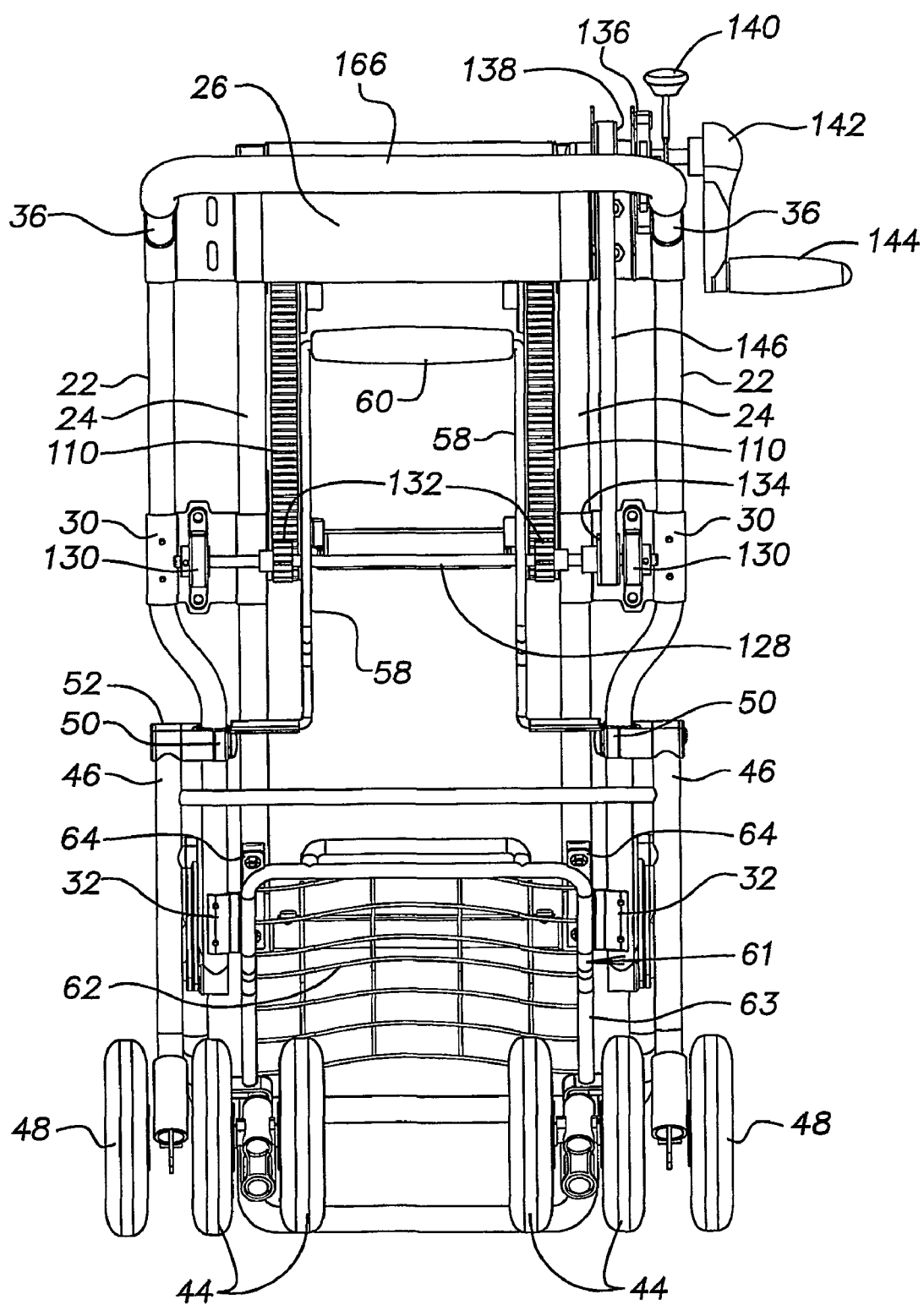
FIG. 4 is a rear elevation view of the cart according to the invention showing the basket removed and wheels in a folded position.
Figure 5:
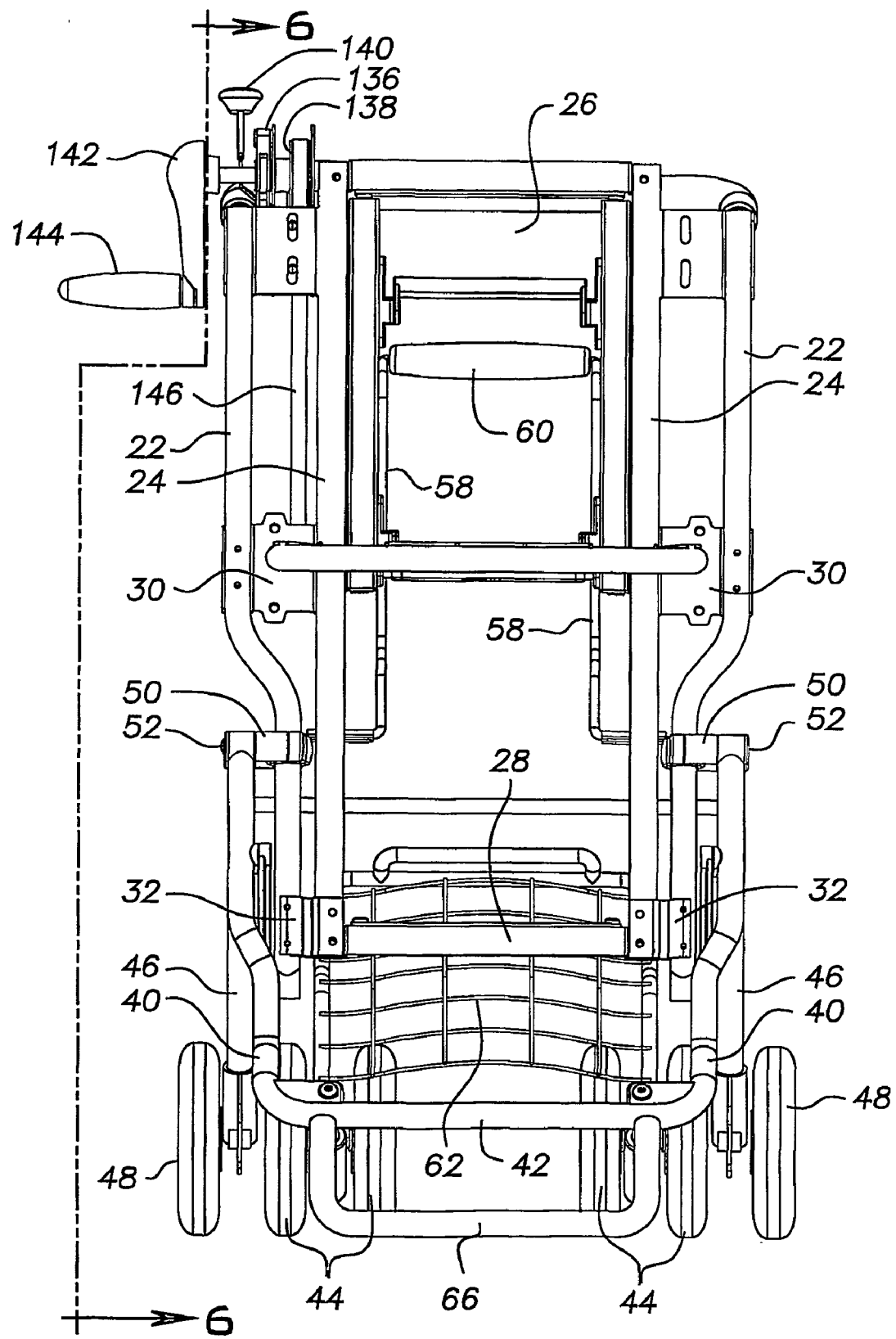
FIG. 5 is a front elevation view of the cart according to the invention showing the basket removed and the wheels in a folded position.

The frame 12 includes a pair of spaced, parallel outer tubes 22 and a pair of spaced, parallel, generally U-shaped channel members 24 that are disposed between and parallel to the tubes 22. Referring particularly to FIGS. 4 and 5, an upper brace 26 spans the width of the frame 12 and connects the upper ends of the tubes 22 to each other. The brace 26 also connects the upper ends of the tubes 22 and the channels 24 to each other. A lower brace 28 connects the lower ends of the channels 24 to each other. Middle and lower brackets 30, 32 connect the outer tubes 22 and the channels 24 to each other. As shown in FIGS. 1 and 2, sleeves 34 are disposed at the lower ends of tubes 22. The sleeves 34 are oriented perpendicular to the longitudinal axes of the tubes 22. A pair of cylindrical posts 36 are connected to, and project rearwardly at an upward angle from, the upper brace 26.

The Wheeled Support Assembly 14

The wheeled support assembly 14 includes a pair of front legs 40 that are connected by a bight portion 42. Castered front wheels 44 are connected to the bight portion near the intersection with the legs 40. A pair of rear legs 46 extend from the rear of the frame 12. A rear wheel 48 is connected to the end of each of the legs 46.

A collar 50 is disposed about the lower end of each of the tubes 22. The collar is 50 in the nature of a sleeve that has fore and aft wings. The legs 40, 46 are connected pivotally to the wings by a connection indicated by the reference numeral 52. The wheeled support assembly 14 includes a pair of links 54 on each side of the cart 10. The links 54 are connected pivotally to the legs 40, 46 at one end. The links 54 are connected pivotally to the sleeves 34 by a connection indicated by the reference numeral 56. A vertically oriented, generally U-shaped lift bar 58 is connected to its ends to the collars 50. The bar 58 includes a rearwardly extending handle 60 for the user to grasp.

A shelf 61 is connected to the bight portion 42 and extends rearwardly between the legs 40. The shelf 61 is made of a wire grid 62 with a supporting perimeter of aluminum tubing 63. A pair of tabs 64 extend rearwardly from the rear corners of the tubing 63. A strap 65 is connected at one end to each of the tabs 64 and is connected at the other end to the rear portion of the lower bracket 32. The straps 65 are made of a strong, stretch-resistant material such as nylon webbing. A generally U-shaped bumper 66 extends forwardly and downwardly from the bight portion 42. The bumper 66 preferably is covered with a resilient material such as rubber or soft plastic.

Referring now to FIG. 12, one or both of the rear wheels 48 includes a brake. The brake employs teeth 67 that project inwardly from the hubs of the wheels 48. A lever 68 is connected to the end of each of the rear legs 46. A pin 69 on the lever 68 is adapted to engage the teeth 67 when the lever 68 is depressed. A suitable brake of the type described is disclosed in U.S. Pat. No. 5,967,535, the disclosure of which is incorporated herein by reference. Other suitable brakes can be used with the cart 10. Reference is made to U.S. Pat. Nos. 4,606,550; 5,800,023; and 6,022,042 for disclosures of brakes that can be used with the wheels 48.

The Basket 16

Figures 6, 7:
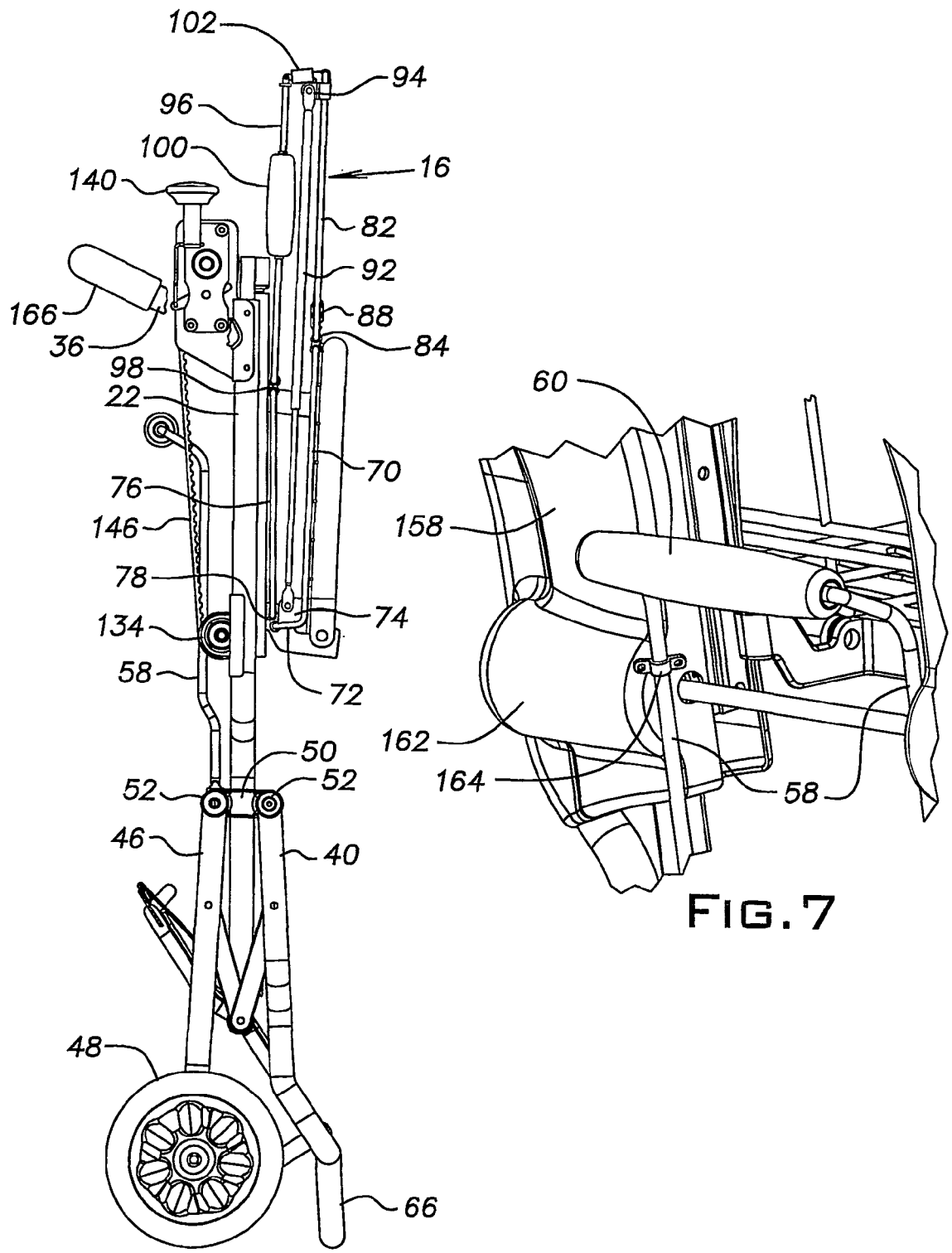
FIG. 6 is a side elevation of the cart according to the invention taken along a plane indicated by line 6—6 in FIG. 5 showing all components of the cart in a folded position.
FIG. 7 is a portion of the cart shown in FIG. 2 enlarged for purposes of clarity of illustration.

The basket 16 defines a generally cubic exterior that is open at the top. The basket 16 is made substantially of welded wire rod joined by plastic clips/hinges that permit the basket 16 to move from an expanded position (FIGS. 1 and 2) to a folded position (FIG. 6). The basket 16 includes a cover (not shown) made of a flexible material such as canvas that permits articles from falling through openings in the basket 16. Because the cover is flexible, it can be collapsed when the basket 16 is collapsed to its folded position. The cover has been omitted in order to show the elements that make up the basket and how they move relative to each other.

The basket 16 includes a bottom wall 70 having an upstanding rear flange 72. Gussets 74 are disposed at the intersection of the bottom wall 70 and the rear flange 72. The basket 16 also includes a rear wall 76. A pair of clips 78 connect the flange 72 and the rear wall 76 for hinging movement relative to each other. The rear wall 76 includes a slot 80.

Figure 9:
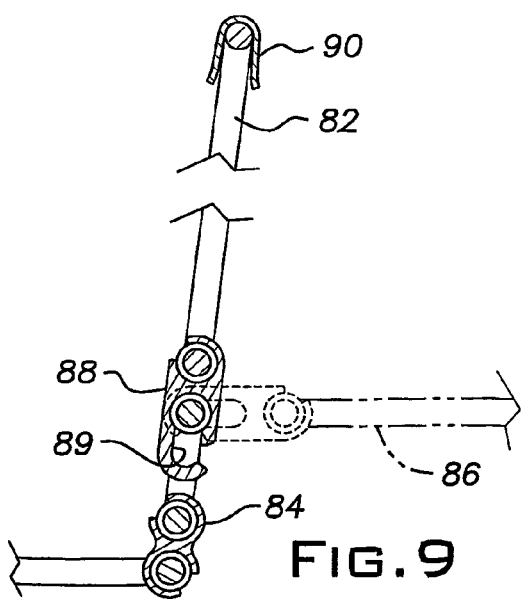
FIG. 9 is a cross-sectional view of a portion of the basket showing how one of its hinges operates.

The basket 16 includes a front wall 82. A pair of clips 84 connect the front wall 82 and the bottom wall 70 for hinging movement relative to each other. A gate 86 is included as part of the front wall 82. Referring particularly to FIG. 9, clips 88 connect the front wall 82 and the gate 86. The clips 88 have an elongate slot 89 that permits the gate 86 to be moved vertically relative to the front wall 82 without rotation. A pair of cuffs 90 (FIGS. 1 and 9) are connected to the upper end of the gate 86. The cuffs 90 extend laterally from the gate 86 and engage the upper, inner portion of the front wall 82.

Telescoping rods 92 define the side walls of the basket 16. One end of each of the rods 92 is connected pivotally to one of the gussets 74. A hinged connection indicated by the reference numeral 94 connects the other end of the rods 92 to the upper, outer end of the front wall 82.

A generally U-shaped wire rod 96 defines the upper perimeter of the basket 16 at the sides and rear thereof. A pair of clips 98 connect the rod 96 and the upper portion of the rear wall 76 for hinging movement relative to each other. A pair of handles 100 are included as part of the rod 96. The handles 100 enable the basket 16 to be lifted by the user and removed from the cart 10. Spring-biased enlarged sleeves 102 connect the forward ends of the rod 96 to the upper ends of the front wall 82, adjacent the connection between the telescoping rods 92 and the front wall 82.

The Basket Carrier Assembly 18

Figure 8:
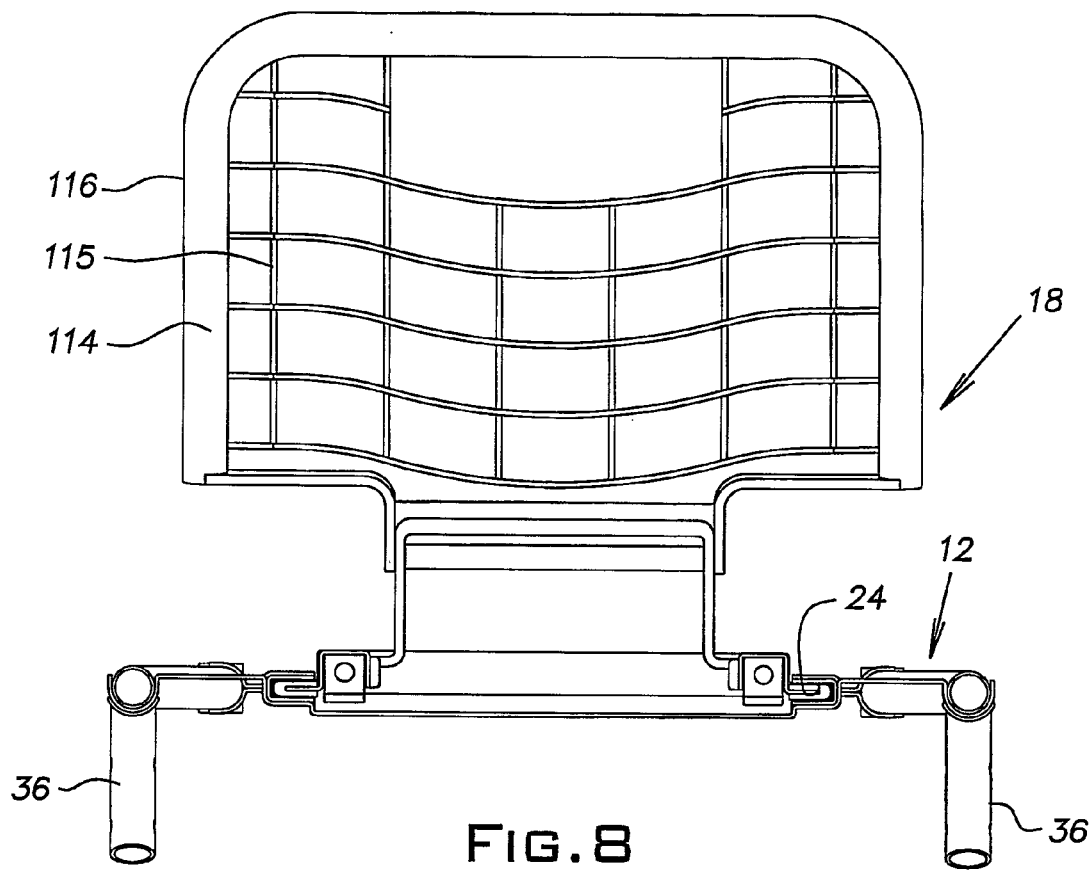
FIG. 8 is a top plan view of a frame and a portion of a basket carrier assembly.

The basket carrier assembly 18 includes a pair of elongate, toothed racks 110 (FIGS. 3, 4, and 5) that are disposed parallel to each other. The racks 110 include a laterally extending flange (FIG. 8) that is disposed within the U-shaped channels 24 of the frame 12. Friction-resistant guides (not shown) of Teflon or nylon are fitted to the flanges. A pair of generally L-shaped arms 112 (FIGS. 10 and 11) extend forwardly from the racks 110. A platform 114 is connected pivotally to the arms 112. In a manner similar to the shelf 62, the platform 114 is made of a wire grid 115 with a supporting perimeter of aluminum tubing 116.

A curved, generally vertically oriented slot 117 is provided in each of the arms 112. A pin 118 included as part of the platform 114 extends through the slot 117. An indent 120 is formed in the upper, forward portion of each of the arms 112. A pin 122 included as part of the platform 114 is adapted to fit into the indent 120 when the platform 114 is in the raised position (FIG. 11). A lug or stop 124 projects forwardly from each of the arms 112 and engages the pin 122 when the platform 114 is in the lowered position (FIG. 10). A generally L-shaped lip 126 (best viewed in FIG. 3) is connected to, and extends forwardly of, the racks 110. The lip 126 is small enough to fit within the slot 80.

A laterally extending shaft 128 (see FIG. 4) is connected to the frame 12 by pillow blocks 130. The pillow blocks 130 themselves are connected to the middle brackets 30. A pair of pinions 132 are mounted on the shaft 128 for rotation therewith. The pinions 132 engage the teeth on the racks 110. A toothed driven pulley 134 is mounted on the shaft 128 for rotation therewith.

A ratchet clutch 136 is connected to the upper brace 26. Ratchet clutch 136 is commercially available from Lowell Corporation of Worcester, Mass., model no. 71 series. The ratchet clutch 136 includes a toothed drive pulley 138, a control knob 140, a crank arm 142, and a handle 144. A toothed drive belt 146 is reeved about the pulleys 134, 138.

The Housing 20

The housing 20 includes an upper portion 150 having recessed portions 152 and 154 (FIG. 1) within which objects such as a cup, keys, and the like can be placed. The housing 20 has a front portion 156 and a rear portion 158. The portions 150, 156, and 158 are made of a strong plastics material such as ABS in a molding operation. The portions 150, 156, 158 are joined by conventional techniques such as screws that extend through openings in the portions 150, 156, 158 into mounting pads included as part of the brace 26 and the brackets 30. As best seen in FIG. 2, the rear portion 158 includes a protrusion 160 that accommodates the drive belt 146. The rear portion 158 also includes protrusions 162 that accommodate the pillow blocks 130 and the pinions 132. Referring particularly to FIG. 7, U-shaped clips 164 are connected to the rear portion 158 by screws. The clips 164 constrain the movement of the bar 58.

A handle 166 made of aluminum tubing is connected to, and spans gap between, the posts 36. As with the bumper 66, the handle 166 can be provided with a resilient cover, if desired. The handle 166 enables the user to maneuver the cart 10.

Operation

Figure 3:
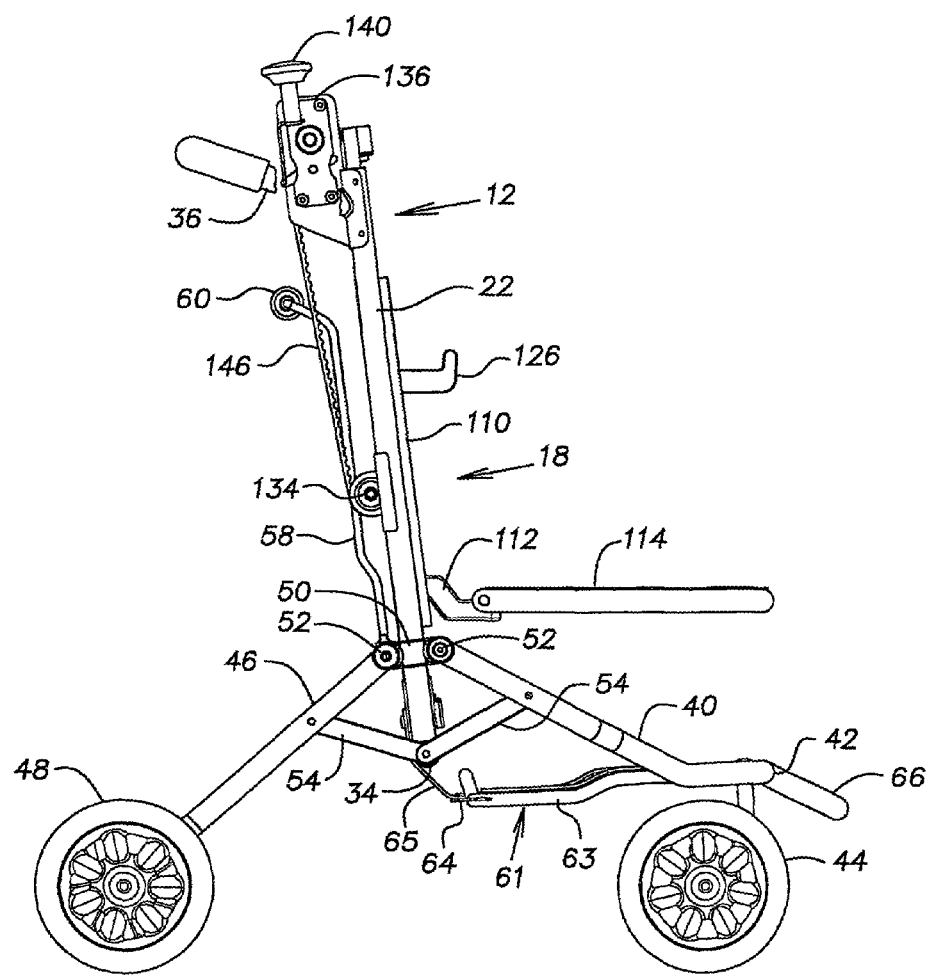
FIG. 3 is a side elevation view of the cart of FIG. 1 with the basket and a housing removed and a basket carrier in a lowered position.

In operation, starting from the cart-extended position shown in FIGS. 1–3, the basket 16 can be raised or lowered by grasping the handle 144 and rotating the crank arm 142. The control knob 140 can be moved between two positions: an "up" position in which the arm 142 can be rotated counterclockwise as viewed in FIG. 3. and a "down" position in which the arm 142 can be rotated clockwise as viewed in FIG. 3. When the arm 142 is rotated counterclockwise, the drive belt 146 will cause the pinions 132 to be rotated counterclockwise, which in turn will cause the racks 110 to be raised. Because the platform 114 is connected to the racks 110, the platform 114 also will be raised. When the control knob is moved to the "down" position and the arm 142 is rotated clockwise, foregoing movements will be reversed and the platform 114 will be lowered. In either direction of movement, the platform 114 will be maintained in the desired vertical position when rotation of the arm 142 is stopped.

If desired, the basket 16 can be removed from the platform 114 merely by grasping the handles 100 and lifting the basket 16 upwardly. The slot 80 will clear the lip 126, permitting the basket 16 to be lifted and removed from the platform 114. When the basket 16 is resting on the platform 114, the interaction of the slot 80 and the lip 126 will prevent the basket 16 from being removed from the platform 114.

When it is desired to fold the cart 10, the handle 60 is grasped and lifted upwardly. The collars 50 will be moved vertically relative to the tubes 22. This movement of the collars 50 will cause the legs 40, 46 to be raised and pivoted toward each other as shown in FIG. 6. The platform 114 can be pivoted toward that position shown in FIG. 6, whereupon the basket 16 will be collapsed into the folded position shown in FIG. 6. The bumper 66 will engage the ground, thus serving as a stand to keep the cart 10 in a vertical position.

The basket cover (not shown) can be provided on its sides with releasable tabs made of hook and loop fasteners to permit the cover to be expanded as the basket 16 is moved into its folded position. When the basket 16 is collapsed, the spring-biased sleeve 102 will resist the collapsing action. When the basket 16 is expanded, the sleeve 102 will tend to keep the basket 16 in the extended position. In order to lower the gate 86, the cuffs 90 are raised so that their lower edges will clear the upper edge of the front wall 82. The slot 89 in the clip 88 permits the gate 86 to be lifted. Once the gate 86 has been lifted, it can be hinged forwardly and downwardly, as indicated in FIG. 9.

When the platform 114 is lifted, the pin 118 is moved in the slot 117. Eventually the pin 122 will engage the indent 120 (FIG. 11), which will tend to keep the platform 114 in the raised position. When the platform 114 is to be lowered, it is raised slightly so that the pin 122 will disengage from the indent 120. Then, the platform 114 can be pivoted into its lowered position. The pin 118 will engage the upper end of the slot 117 and the pin 122 will engage the stop 124. Together, these elements will maintain the platform 114 in a horizontal position.

When it is desired to extend the cart 10 to its unfolded position as shown in FIGS. 1 and 2, the foregoing process can be reversed. By lowering the platform 114, the basket 116 will be extended. By lowering the handle 58, the wheeled support assembly 14 will be extended. If the user applies a load to the shelf 61, the straps 66 will be stretched and will prevent the shelf 61 from being flexed excessively. When the cart 10 is collapsed to its folded position, the straps 66 will not interfere with the folding operation.

Although the invention has been disclosed in its preferred embodiment, it will be appreciated by those skilled in the art that various changes and modifications can be made without departing from the true spirit and scope of the invention as hereinafter claimed. It is intended that the patent shall cover all such changes and modifications.

What is claimed is:

1. A utility cart, comprising:
   a pair of spaced, generally parallel frame members having upper and lower ends;
   a collar disposed about each of the frame members and slidable therealong;
   a pair of front legs each having first and second ends, the first end connected to one of the collars and the second end supporting a wheel;
   a pair of rear legs each having first and second ends, the first end connected to one of the collars and the second end supporting a wheel;
   a lift bar connected to each of the collars, the lift bar being movable from a raised position where the collars are raised along the frame members and the legs and wheels are moved toward each other, to a lowered position where the collars are lowered along the frame members and the legs and wheels are moved away from each other such that the front and rear legs are generally parallel with each other and the wheels are extended to support the cart for movement on the ground.

2. The cart of claim 1, further comprising links connected pivotally at one end to the lower ends of the frame members and connected pivotally at the other end to the front and rear legs at a location intermediate the first and second ends.

3. The cart of claim 1, further comprising:
   a bight portion that connects the first and second legs;
   a shelf connected to the bight portion and extending rearwardly toward the frame members; and
   straps connected between the rear of the shelf and the frame members, the straps being under tension when a load is carried by the shelf.

4. The cart of claim 3, further comprising a bumper connected to the bight portion and extending forwardly therefrom.

5. The cart of claim 1, further comprising:
   a basket; and
   a basket carrier assembly for moving the basket up and down, the basket carrier assembly including:
   a pair of spaced, generally parallel channel members having upper and lower ends;
   a pair of toothed racks connected to the channel members and slidable therealong;
   a basket-supporting platform connected to the racks and projecting forwardly of the cart;
   a shaft disposed adjacent the racks and supported for rotation about a horizontal axis;
   a pair of pinions carried by the shaft, the pinions being in engagement with the racks;
   a driven pulley carried by the shaft;
   a drive pulley disposed adjacent the racks and supported for rotational movement about a horizontal axis;
   a crank arm having a handle connected to the drive pulley; and
   a drive belt reeved about the drive pulley and the driven pulley, whereby rotation of the crank arm will cause the pinions to be rotated so as to move the racks relative to the channel members.

6. The cart of claim 5, wherein the drive pulley is included as part of a ratchet clutch that permits the drive pulley to be rotated in either direction and stopped in any desired position.

7. The cart of claim 5, wherein the basket is connected to the racks by a hinged platform that can be pivoted between a folded position and an extended position, the connection between the platform and the platform being provided by:
   a pair of generally L-shaped arms extending forwardly of the racks;
   a generally vertically oriented slot in each arm, an indent in the upper edge of each arm, and a stop extending forwardly of each arm;
   first and second pins projecting laterally from each side of the platform, the first pin being disposed in the slot and the second pin adapted to fit within the indent, whereby when the platform is extended, the underside of the platform engages the stop and the first pin engages the upper end of the slot, and when the platform is raised, the second pin fits within the indent.

8. A utility cart, comprising:
   a pair of spaced, generally parallel channel members having upper and lower ends;
   a pair of toothed racks connected to the channel members and slidable therealong;
   a basket connected to the racks and projecting forwardly of the cart;
   a shaft disposed adjacent the toothed racks for rotation about a horizontal axis;
   a pair of pinions carried by a shaft, the pinions being in engagement with the racks;
   a driven pulley carried by the shaft;
   a drive pulley supported for rotational movement;
   a crank arm having a handle connected to the drive pulley; and
   a drive belt reeved about the drive pulley and the driven pulley, whereby rotation of the crank arm will cause the pinions to be rotated so as to move the racks relative to the channel members.

9. The cart of claim 8, wherein the drive pulley is included as part of a ratchet clutch that permits the drive pulley to be rotated in either direction and stopped in any desired position.

10. The cart of claim 8, wherein the basket is connected to the racks by a hinged platform that can be pivoted between a folded position and an extended position, the connection between the platform and the racks being provided by:
    a pair of generally L-shaped arms extending forwardly of the racks;
    a generally vertically oriented slot in each arm, an indent in the upper edge of each arm, and a stop extending forwardly of each arm;
    first and second pins projecting laterally from each side of the platform, the first pin being disposed in the slot and the second pin adapted to fit within the indent, whereby when the platform is extended, the underside of the platform engages the stop and the first pin engages the upper end of the slot, and when the platform is raised, the second pin fits within the indent.

11. A utility cart, comprising:
a frame having a pair of spaced tube members having upper and lower ends, a pair of spaced channel members having upper and lower ends, the tube members and the channel members being disposed parallel with each other, the channel members being disposed between the tube members, the tube members and the channel members being connected to each other by upper and lower braces and intermediate brackets;
a wheeled support connected to the frame, including:
   a collar disposed about each of the tube members and slidable therealong;
   a pair of front legs each having first and second ends, the first end connected to one of the collars and the second end supporting a wheel;
   a pair of rear legs each having first and second ends, the first end connected to one of the collars and the second end supporting a wheel;
   links connected pivotally at one end to the lower portion of the tube members and connected pivotally at the other end to the front and rear legs at a location intermediate the first and second ends;
   a lift bar connected to each of the collars, the lift bar being movable from a raised position where the collars are raised along the tube members and the legs and wheels are moved toward each other, to a lowered position where the collars are lowered along the tube members and the legs and wheels are moved away from each other such that the front and rear legs are generally parallel with each other and the wheels are extended to support the cart for movement on the ground;
a basket carrier assembly connected to the frame, including:
   a pair of toothed racks connected to the channel members and slidable therealong;
   a platform connected to the racks and projecting forwardly of the cart;
   a shaft connected to the intermediate brackets for rotation about a horizontal axis;
   a pair of pinions carried by the shaft, the pinions being in engagement with the racks;
   a driven pulley carried by the shaft;
   a drive pulley connected to the upper brace for rotation about a horizontal axis;
   a crank arm having a handle connected to the drive pulley; and
   a drive belt reeved about the drive pulley and the driven pulley, whereby rotation of the crank arm will cause the pinions to be rotated so as to move the racks relative to the channel members;
a basket disposed on the platform; and
a handle connected to the upper brace.

12. The cart of claim 11, further comprising:
   a bight portion that connects the first and second legs;
   a shelf connected to the legs and the bight portion and extending rearwardly toward the tube members;
   straps connected between the legs and the tube members, the straps being under tension when a load is carried by the shelf; and
   a bumper connected to the bight portion and extending forwardly therefrom.

13. The cart of claim 11, wherein the drive pulley is included as part of a ratchet clutch that permits the drive pulley to be rotated in either direction and stopped in any desired position.

14. The cart of claim 11, wherein the basket is connected to the racks by a hinged platform that can be pivoted between a folded position and an extended position, the connection between the platform and the racks being provided by:
   a pair of generally L-shaped arms extending forwardly of the racks;
   a generally vertically oriented slot in each arm, an indent in the upper edge of each arm, and a stop extending forwardly of each arm;
   first and second pins projecting laterally from each side of the platform, the first pin being disposed in the slot and the second pin adapted to fit within the indent, whereby when the platform is extended, the underside of the platform engages the stop and the first pin engages the upper end of the slot, and when the platform is raised, the second pin fits within the indent.

15. The cart of claim 11, wherein the basket is made primarily of welded wire rod and comprises:
   a bottom wall having a rear upstanding flange and a front edge;
   a rear wall connected hingedly to the upstanding flange;
   a front wall connected hingedly to the front edge of the bottom wall, the front wall including a hinged gate that can be moved relative to the front wall;
   side walls defined by telescoping rods, the rods extending between:
      the intersection between the bottom wall and the upstanding flange; and
      the upper edge of the front wall;
   a U-shaped upper perimeter rod, the rod being connected hingedly to the upper edge of the rear wall and the upper edge of the front wall;
   a spring-biased sleeve at the intersection of the upper perimeter rod and the front wall; and
   a pair of handles included as part of the upper perimeter rod.

* * * * *